Sept. 18, 1951     O. J. BLOMBERG     2,568,482
SWITCH
Filed March 10, 1948     3 Sheets-Sheet 1
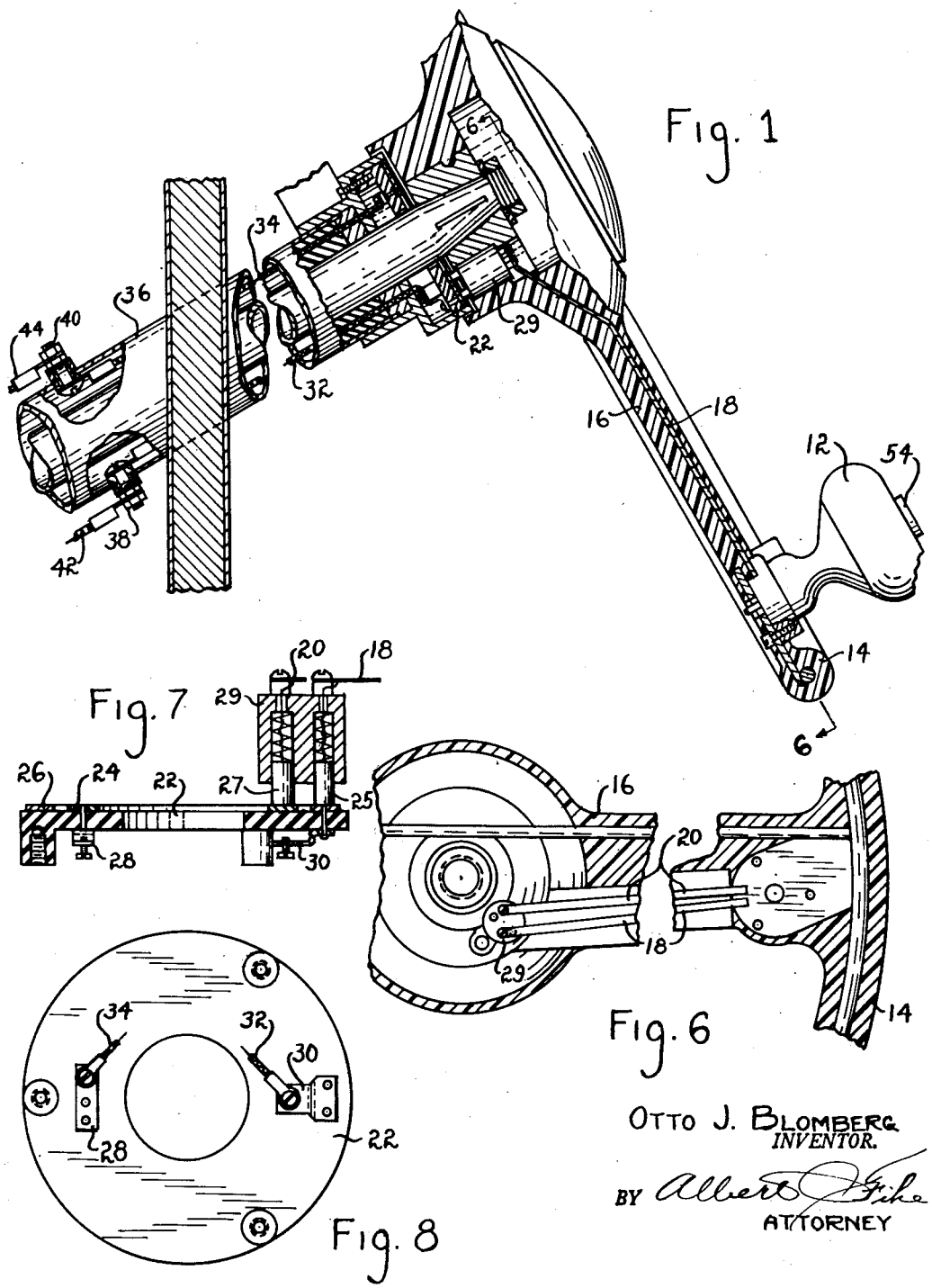
OTTO J. BLOMBERG
INVENTOR.
BY Albert Fike
ATTORNEY Sept. 18, 1951      O. J. BLOMBERG      2,568,482
SWITCH
Filed March 10, 1948      3 Sheets-Sheet 2
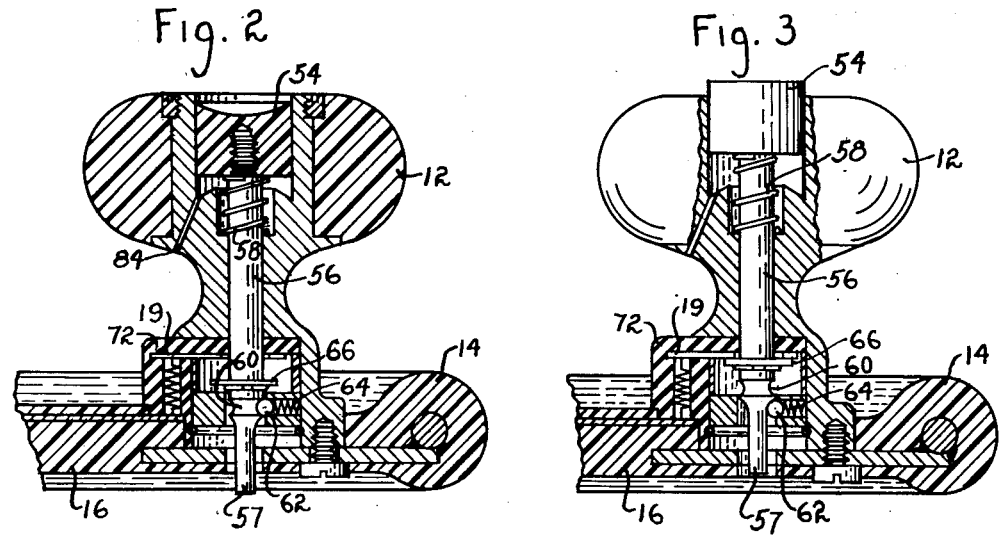
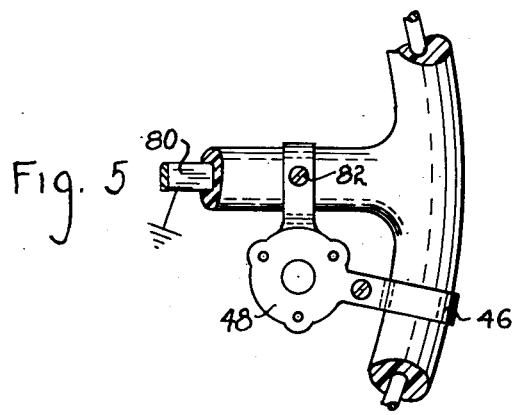
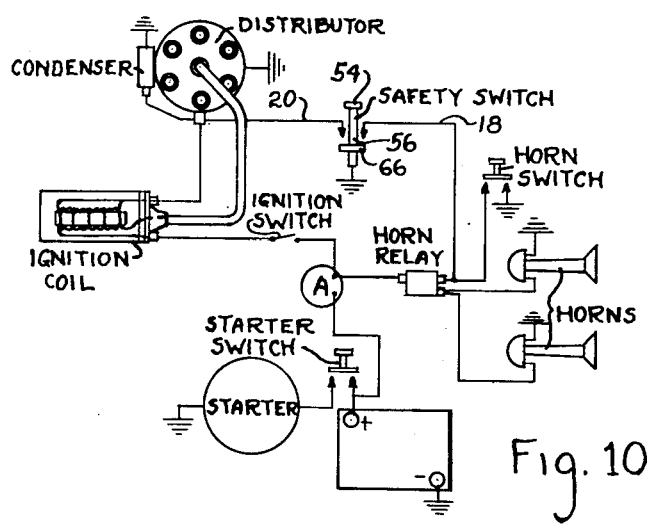
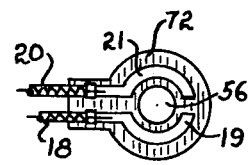
Otto J. Blomberg
INVENTOR.
BY Albert J. Fihe
ATTORNEY Sept. 18, 1951     O. J. BLOMBERG     2,568,482

SWITCH

Filed March 10, 1948     3 Sheets-Sheet 3

OTTO J. BLOMBERG
*INVENTOR.*

BY Albert Fihe
ATTORNEY

Patented Sept. 18, 1951

2,568,482

UNITED STATES PATENT OFFICE 2,568,482

SWITCH

Otto J. Blomberg, Chicago, Ill.

Application March 10, 1948, Serial No. 14,011

1 Claim. (Cl. 200—159)

This invention relates to an improved motorist's safeguard and has for one of its principal objects the provision of means which will automatically warn the driver of an automobile or the like of his exhausted or semi-exhausted physical condition whereby further driving is rendered unsafe.

One of the important objects of this invention is to provide means connected with the steering mechanism of a motor vehicle, which will provide the driver with an alarm system which is constantly under his control, and which, when the driver becomes excessively sleepy or exhausted, will automatically set-up an alarm system in sufficient time to enable the driver to regain control of vehicle and avoid a possible accident.

Another object of the invention is the provision of an alarm system for motor vehicles or the like, which is preferably constantly controlled by the hand or hands of the driver, and which, when the hands are relaxed, due to excess fatigue or sleepiness will immediately alarm the driver and also act to automatically slacken the speed of the vehicle and eventually stop it.

A further object of this invention is the automatic sounding of an alarm, such as blowing the horn of the vehicle, when danger arises from insufficient control thereof and in the event that the driver does not respond to such an alarm on account of over-exhaustion or from some other cause, such as a heart attack or similar condition, the same means which automatically sounds the alarm, will simultaneously close another or second electrical circuit which will short the ignition circuit and therefore automatically stop the motor. This, of course, will slow down the speed of and finally stop the vehicle and the alarm sounding at the same time will serve as a distress signal and also as a warning to other and approaching vehicles, whereby possible accidents will be prevented.

A still further object of the invention is the provision of automatic alarm means to be installed in an automotive vehicle whereby in the event of a serious accident or collision, the device will automatically serve both as a distress signal and to also shut off the engine and ignition, thereby preventing a possible fire. The device can be built into new cars as well as installed in old ones.

Another and still further important object of the invention is to provide, in an automatic alarm and engine cut-off for vehicles, a dependable and durable steering wheel knob or ball with which to spin or whirl the steering wheel when such action becomes necessary or desirable.

Other and further important objects of the invention will be apparent from the disclosures in the accompanying drawings and following specification.

The invention, in a preferred form, is illustrated in the drawings and hereinafter more fully described.

In the drawings:

Figure 1 is a view, practically entirely in section, showing the steering wheel of an automobile or similar vehicle with the improved device of this invention applied thereto.

Figure 2 is an enlarged detail view, also practically wholly in section, showing the combination automatic alarm and steering wheel knob of this invention and illustrating same locked in an inoperative position, whereby it will serve solely and simply as a steering wheel knob. This condition, of course, applies when the driver is quite sure that he does not require the automatic alarm setting.

Figure 3 is a view somewhat similar to that of Figure 2, but showing the invention in actual alarm position with the circuit closer definitely completing the two electrical circuits of the device, one being for the horn sounding or other alarm and the other being for shorting or cutting out part of the ignition circuits of the motor.

Figure 4:
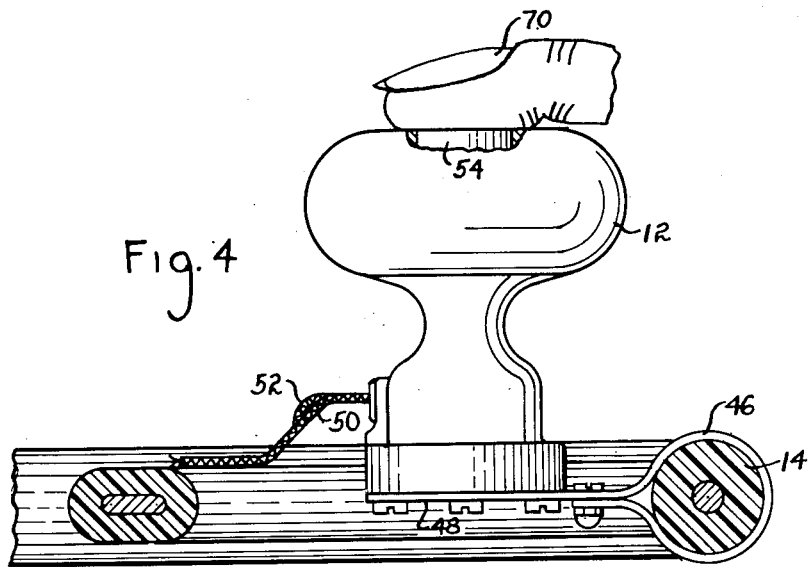

Figure 4 is a side view of the apparatus showing the device in unlocked or free position ready to automatically close the circuits which are illustrated in detail in Figures 2 and 3, but with the circuit closer held in open position by the driver's thumb. This figure also illustrates a slight departure from the construction of Figures 1, 2 and 3 in that the apparatus is removably attached to the steering wheel instead of forming an integral part thereof.

Figure 5 is a plan view of a portion of a steering wheel illustrating a supporting bracket which will removably maintain in desired position the combination steering knob and alarm device of this invention.

Figure 6 shows in section and in some detail, the positioning of some of the electrical connections of the device when the same forms an integral part of the steering wheel itself and this section is taken on the line 6—6 of Figure 1.

Figure 7 is a sectional view of the collector ring for the electrical circuit whereby the steering wheel may be turned through a full 360 degrees while at the same time maintaining all necessary current carrying contacts.

Figure 8 is a bottom view of the collector ring shown in Figure 7.

Figure 9 is a plan view of the insulation block for the original electrical circuit and shows the contacts and connecting wires.

Figure 10 is a wiring diagram showing a preferred means of hook-up for the circuits of the invention.

Figure 11:
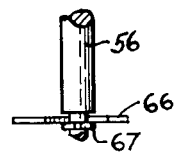

Figure 11 is an enlarged view showing the contact ring and associated parts, the ring being illustrated in section.

Figure 12:
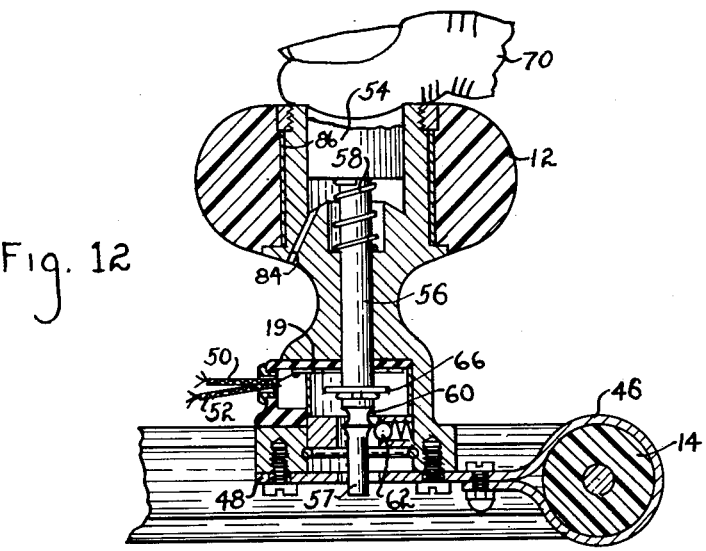

Figure 12 is an enlarged section of the device illustrated in Figure 4 but showing the same in a different operating position and also illustrating a further slight modification.

As shown in the drawings:

The reference numeral 12 indicates generally a steering knob, which is common in the art, and which is in a great many instances, applied to the steering wheel 14 of an automotive vehicle whereby the wheel may be more readily turned or spun for control purposes. This particular steering wheel knob differs from those now on the market in that it incorporates the automatic alarm and engine shut-off of this invention.

In one embodiment, the knob with its appurtenances, is installed as an integral part of the steering wheel, being preferably built on to one of the spokes 16 of the wheel.

In this embodiment two current carrying wires or the like 18 and 20 are built into the spoke, as best shown in Figures 6 and 7, and led to a circular collector element 22 having current carrying rings 24 and 26 incorporated into its upper face, which, in turn, are respectively connected through brushes 25 and 27 in a holder 29 to binding posts 28 and 30 from whence additional wires 32 and 34 are brought down through the steering wheel column 36 and thence out of the column by means of insulated binding posts 38 and 40. From these binding posts further wires 42 and 44 lead to the respective horn and ignition distributor housing terminal connections.

In the embodiment shown in Figures 4, 5 and 10, the steering knob and control combination of this invention is removably fastened to the steering wheel by means of a clamp 46 or the like, which is provided with a base plate 48 upon which the knob 12 is mounted. In this embodiment, wires 50 and 52 are brought out of the base of the knob and connected to the horn switch wire and the terminal on the distributor housing.

The wiring of this universal or attachable type motorist's safeguard does not require the same connections such as the collector ring 22 and its appurtenances. It is only necessary to make a connection with the present horn switch circuit for the alarm circuit. When connecting both alarm and ignition systems, the installer must remove the present horn switch wire and replace it with a double electrical wire and connect this with the switch wires 50 and 52 brought out of the base. These connections will vary for different makes and models of automobiles. The serviceman, when installing the motorist's safeguard of this invention, has to take this into consideration and make the connection accordingly.

The other end of the double lead wire, however, connects, in all cases, one to the horn relay and one to the distributor housing terminal.

The knob 12 is in all cases, provided at its top with a centrally disposed control or push-button 54, which is mounted at the upper-end of a rod 56, which is slidably positioned in the hollow center of the knob. A helical spring 58 normally urges the knob and rod into their upper-most position, as illustrated in Figures 3 and 10.

The rod 56 extends completely through the knob 12 and its base and when the push or control button 54 is depressed, the lower end 57 of this rod 56 projects slightly below the under face of the knob support, so that the rod can be manipulated by upward pressure on this extension.

The rod 56 is reduced in diameter adjacent its lower end and is also provided with an annular groove 60, into which is fitted a ball 62 pressed into rod-contacting position by means of spring 64. When the control or push-button 54 and rod 56 are depressed into the position shown in Figure 2, the spring-pressed ball 62 rides into the groove 60 thereby retaining the rod and push-button in this depressed position. In this position no contact will be made so far as the alarm connections are concerned.

The rod is provided with a self aligning ring-like electrical contact making element 66 which is positioned on the rod just above the groove 60 as shown in Figures 2 and 3. When the rod and control button are in their upper-most position as shown in Figure 3, a circuit is established between the horn and the ground; and between the ignition distributor terminal and the ground by means of the connecting wires 18, 20, 32, 34, 42 and 44. When these two circuits are established, the horn is sounded and the ignition is short circuited. The terminals 19 and 21 of the wires 18 and 20 which contact with the circuit maker 66 are mounted in an insulator element 72 which forms part of the base of the knob 12. A snap ring 67 holds the circuit maker 66 in desired position on the rod 56 (Fig. 11) and this is held rather loosely so that it is self-aligning to assure good contact with the two electrical circuits.

When the operator of the automobile or the like decides that, owing to certain fatigue conditions or the like, he should employ the safety device of this invention, he pushes the lower end 57 of the rod 56 upwardly until the ball 62 is out of the groove 60 and at the same time the level of the control or push-button 54 is raised very slightly above the upper face of the knob 12 (Figure 10). If a momentary contact between the element 66 and the terminals of the wires 18 and 20 is made at this time, it will of course cause no difficulty. The operator then places his thumb as shown at 70 in Figure 4 upon the push-button 54 and holds this button down into a position as shown in Figure 10, which is intermediate between the locked position shown in Figure 2 and the alarm sounding position shown in Figure 3, so that the horn will not sound and the motor will continue to operate normally. This condition will continue to prevail until, due to sleepiness or other cause, the operator relaxes sufficiently so that the desired pressure of his thumb 70 on the push-button 54 is not sufficient to maintain the push-button and rod in non-alarm position. If this occurs, the spring 58 will push the button and rod upwardly until the contact element 66 completes the circuit to the horn and distributor as herein-above described.

As best illustrated in Figure 10, contact of the element 66 between the ground of the automobile or other apparatus and the wires 18 and 20 is established when the control button 54 is in its elevated position. The wire 18 leads to the horn, circuit and will operate the horn through its corresponding relay.

The wire 20 is preferably connected to the wire to the ignition coil and just ahead of the distributor, so that when contact is made at 66, the distributor will be short circuited, thereby stopping the motor. In the embodiment shown in Figures 4 and 5, the ground connection is made through one of the spokes 80 of the steering wheel 14, preferably by means of a set screw 82 which penetrates the usual outer layer of the wheel spoke and contacts the metal portion 80. This screw 82 also assists in maintaining the supporting bracket 48 in proper position.

If the automobile or truck is provided with a steering wheel with uncovered steel spokes, no special ground connection is required, in that the mounting bracket and its base are directly grounded to the spoke of the wheel.

Two keyways can be provided in the steering wheel hub when the construction illustrated in Figure 1 is employed, thereby making it possible to provide the wheel with the motorist's safeguard of this invention on either the right or left sides, as desired.

A vent or drain 84 can be incorporated into the knob 12, which prevents water and dust from interfering with the operation of the mechanism. This is especially important in open cars or those of the type known as convertibles where foreign matter can penetrate. A bushing 86 can also be provided between the central support of the knob and its rotatable portion, so that operation is rendered more easy.

The safe guard of this invention may also be employed as an alarm by pilots of air planes, especially when taking long distance flights.

It will be seen that herein is provided a motorist's safeguard wherein the circuit closer controls two electrical circuits, one side of which is grounded through the steering wheel and steering post as shaft.

The other side of the circuit closer is electrically connected with the horn or other practical signal and with suitable connections to the battery so that, when the circuit is automatically closed whenever the driver's thumb relaxes, the signal is actuated and simultaneously the ignition circuit to the engine is cut off. The two circuits are insulated from and independent of each other so long as the circuit closer is in a locked-out position or held in a neutral position.

I am aware that many changes may be made and numerous details of construction varied throughout a wide range, without departing from the principles of this invention and I therefore do not purpose limiting the patent granted hereon otherwise than as necessitated by the prior art.

I claim as my invention:

A switch for automobiles, including a push button, a circuit closer operated thereby, a spring controlled means being part of the circuit closer, associated with the button, means for locking the spring controlled means in open circuit and out of electrical contacting position when not in use, a supporting rod connected to the button for manipulating said locking means, said rod forming part of the locking means, an annular groove in the rod and a spring-pressed ball adapted to ride in the groove, the button being adapted to be used to hold the spring controlled means in open position after release of the locking means, the rod having an extension projecting below the switch housing whereby it and its connected control button can be manipulated into desired position.

OTTO J. BLOMBERG.

REFERENCES CITED

The following references are of record in the file of this patent:

UNITED STATES PATENTS

| Number | Name | Date |
| --- | --- | --- |
| 626,919 | Medary | June 13, 1899 |
| 1,572,995 | Gates | Feb. 16, 1926 |
| 1,881,878 | Nidy | Oct. 11, 1932 |
| 2,347,874 | Bluemle | May 2, 1944 |
| 2,352,248 | Bramming | June 27, 1944 |
| 2,496,092 | Hinds | Jan. 31, 1950 |

FOREIGN PATENTS

| Number | Country | Date |
| --- | --- | --- |
| 265,967 | Great Britain | June 8, 1928 |

OTHER REFERENCES

Popular Mechanics, August 1935, page 239.